(12) United States Patent
Sato et al.

(10) Patent No.: US 8,861,920 B2
(45) Date of Patent: Oct. 14, 2014

(54) OPTICAL FIBER HOLDER AND METHOD FOR HOLDING COATED OPTICAL FIBER

(75) Inventors: Ryuichiro Sato, Kanagawa (JP);
Hiroyasu Toyooka, Kanagawa (JP);
Toshihiko Homma, Kanagawa (JP);
Kiyotaka Murashima, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 238 days.

(21) Appl. No.: 13/513,454

(22) PCT Filed: Dec. 17, 2010

(86) PCT No.: PCT/JP2010/072746
§ 371 (c)(1),
(2), (4) Date: Jun. 1, 2012

(87) PCT Pub. No.: WO2011/078072
PCT Pub. Date: Jun. 30, 2011

(65) Prior Publication Data
US 2012/0251068 A1    Oct. 4, 2012

(30) Foreign Application Priority Data
Dec. 21, 2009  (JP) ................................ 2009-289425

(51) Int. Cl.
*G02B 6/36* (2006.01)
*G02B 6/44* (2006.01)
*G02B 6/255* (2006.01)
*G02B 6/245* (2006.01)

(52) U.S. Cl.
CPC ............ *G02B 6/2553* (2013.01); *G02B 6/4471* (2013.01); *G02B 6/3616* (2013.01); *G02B 6/245* (2013.01); *G02B 6/2555* (2013.01)
USPC .......................................................... 385/137

(58) Field of Classification Search
None
See application file for complete search history.

(56) References Cited

FOREIGN PATENT DOCUMENTS

| CN | 1097066 A | 1/1995 |
|---|---|---|
| CN | 1697990 A | 11/2005 |
| JP | 64-000502 A | 1/1989 |
| JP | 64-035404 A | 2/1989 |
| JP | 11-231164 A | 8/1999 |

OTHER PUBLICATIONS

Chinese Office Action of the corresponding Chinese Application No. 201080058494.9, dated Jul. 1, 2013.

*Primary Examiner* — Jerry Rahll
(74) *Attorney, Agent, or Firm* — Global IP Counselors, LLP

(57) ABSTRACT

An optical fiber holder includes a holder main body and cord receiving groove. The holder main body has a fiber receiving groove and a first cord receiving groove. The fiber receiving groove receives and positions a coated optical fiber of an optical fiber cord with a cord jacket removed at the tip of the optical fiber cord. The cord receiving groove receives the cord jacket. A cord holding cover and a fiber pressing cover 13 are attached to the holder main body 6 for movement between respective open closed positions. The cord holder cover includes a second cord receiving groove that cooperates with the first cord receiving groove to form an insertion through hole having a circular cross-section that allows for insertion of the optical fiber. The fiber pressing cover presses the coated optical fiber against the holder main body with the coated optical fiber in the fiber receiving groove.

8 Claims, 17 Drawing Sheets

OPTICAL FIBER HOLDER AND METHOD FOR HOLDING COATED OPTICAL FIBER

FIELD OF THE INVENTION

The present invention relates to an optical fiber holder for holding a coated optical fiber accommodated in an optical fiber cord having built-in high strength fibers and a method for holding the coated optical fiber.

BACKGROUND INFORMATION

Japanese Patent Laid-Open No. 11-231164 (Patent Literature 1) describes an optical fiber holder including a holder main body and two covers attached to the holder main body in an openable and closable manner. The holder main body includes a positioning groove in which a coated optical fiber exposed out of an optical fiber cord is received and positioned, a cord portion groove that receives a cord portion of the optical fiber cord, and a groove-shaped space which is located between the positioning groove and the cord portion groove and where high strength fibers around the coated optical fiber are separated. One of the covers fixes the coated optical fiber received in the positioning groove, and the other cover fixes the cord portion received in the cord portion groove.

To hold the coated optical fiber by using the optical fiber holder, the high strength fibers are separated and routed backward through both side portions of the space formed in the holder main body. Since the high strength fibers are tightly disposed around the coated optical fiber, separating the high strength fibers from the coated optical fiber and taking them out of the space is a cumbersome, time-consuming task. Further, since an operator manually separates the high strength fibers and takes them out, the quality of the task depends on the skill of the operator. For example, when the coated optical fiber is fusion spliced to another, a low-skilled operator can accidentally burn the high strength fibers due to high temperature in a fusion discharge process or allow the high strength fibers to come into contact with the fusion spliced portion, resulting in a decrease in quality of the spliced coated optical fibers.

SUMMARY OF INVENTION

An object of the invention is to provide an optical fiber holder that allows high strength fibers to be readily handled with no loss of splicing quality when the optical fiber holder holds a coated optical fiber and a method for holding a coated optical fiber.

To achieve the object described above, a novel optical fiber holder for holding a coated optical fiber accommodated in an optical fiber cord having built-in high strength fibers is provided. The optical fiber holder includes a holder main body including: a fiber receiving groove to receive the coated optical fiber exposed out of the optical fiber cord from which a cord jacket is removed at the tip thereof; a cord holding base including a first cord receiving groove to receive the cord jacket of the optical fiber cord; a cord holding cover that is attached to the holder main body in an openable and closable manner and includes a second receiving groove that cooperates with the first cord receiving groove to form an insertion through hole into which the optical fiber cord is inserted; and a fiber pressing cover that is attached to the holder main body in an openable and closable manner and presses the coated optical fiber received in the fiber receiving groove against the holder main body, and the insertion through hole is shaped and dimensioned such that the high strength fibers of the optical fiber cord being inserted into the insertion through hole, the high strength fibers being exposed along with the coated optical fiber, come into contact with inner wall surfaces of the cord holding base and the cord holding cover, which form the insertion through hole.

In the optical fiber holder according to the invention, the cord holding base can be integrated with the holder main body or can be attached to the holder main body in an openable and closable manner independent of the cord holding cover.

Another aspect of the invention provides a novel method for holding a coated optical fiber accommodated in an optical fiber cord having built-in high strength fibers. The method for holding a coated optical fiber includes the steps of: providing the optical fiber holder described above; exposing the coated optical fiber and the high strength fibers by removing a cord jacket at the tip of the optical fiber cord; inserting the optical fiber cord into the insertion through hole formed by the cord holding base and the cord holding cover so that the coated optical fiber is received by the fiber receiving groove; and pressing the coated optical fiber with the fiber pressing cover against the holder main body.

According to the invention, the high strength fibers can be handled readily with no loss of splicing quality in the process of holding the coated optical fiber by using the optical fiber holder. As a result, a burden on an operator can be reduced. Further, the operation time can be shortened and the operation efficiency can be improved.

DETAILED DESCRIPTION

Figure 1:
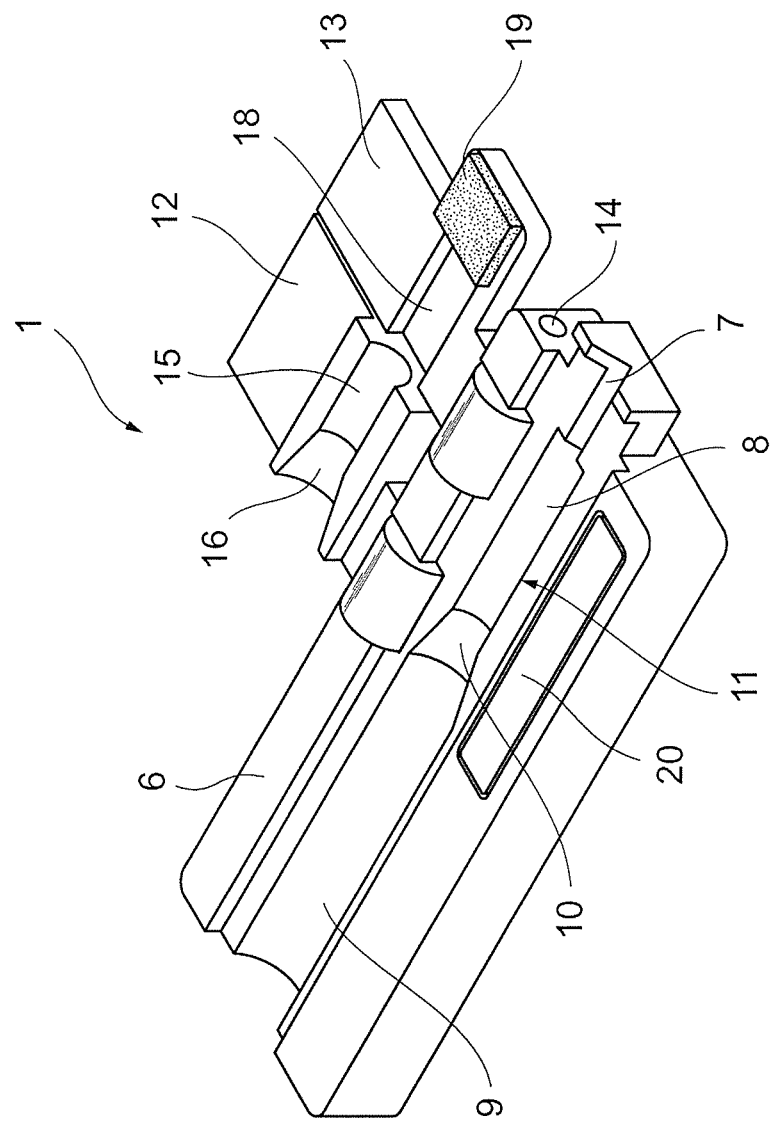
FIG. 1 is a perspective view showing a first embodiment of an optical fiber holder according to the invention.

Embodiments of the invention will be described below with reference to the drawings. The drawings are provided to help describing the invention but are not intended to limit the scope of the invention. In the drawings, to avoid redundant description, the identical reference numerals denote the same portions. The drawings are not necessarily to scale.

FIG. 1 is a perspective view showing an optical fiber holder 1, which is a first embodiment according to the invention. The optical fiber holder 1 holds a coated optical fiber of an optical fiber cord, for example, when the coated optical fiber is fusion spliced to a coated optical fiber of another optical fiber cord.

Figure 2:
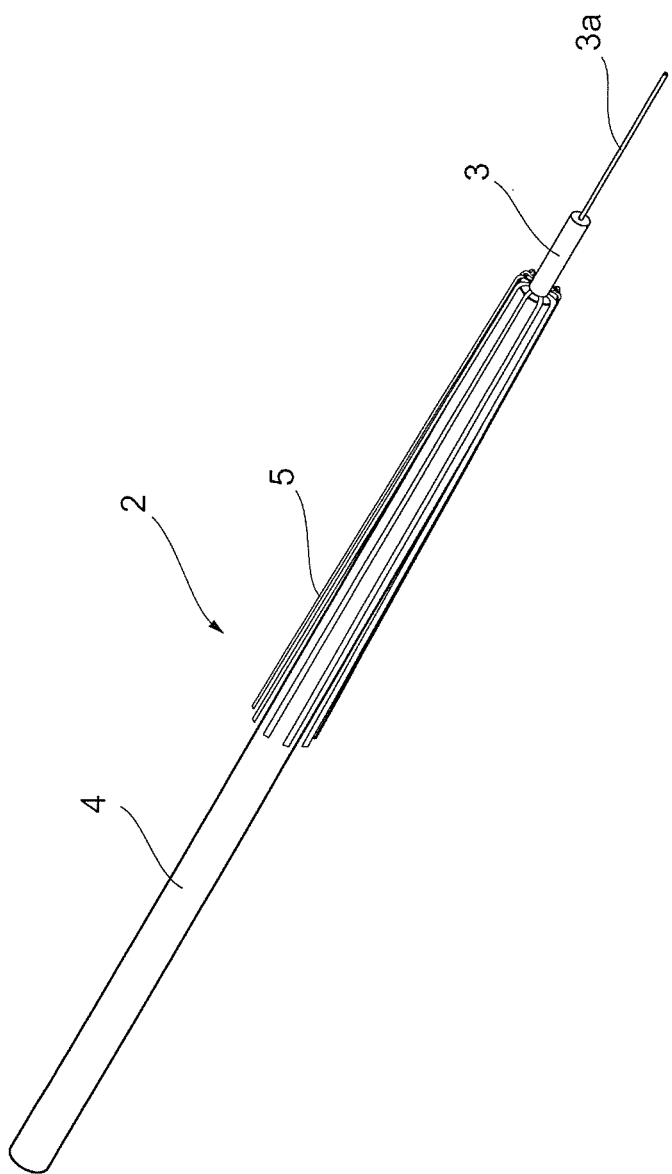
FIG. 2 is a perspective view showing an optical fiber cord to be held by the optical fiber holder according to the invention.

FIG. 2 is a perspective view showing an optical fiber cord 2 to be held by the optical fiber holder 1. The optical fiber cord 2 includes a coated optical fiber 3 having a bare fiber 3a coated with a resin, a cord jacket 4 that surrounds the coated optical fiber 3, and high strength fibers 5 interposed between the coated optical fiber 3 and the cord jacket 4. The diameter of the coated optical fiber 3 ranges from about 0.25 to 0.90 mm. The diameter of the cord jacket 4 ranges from about 2 to 5 mm. The cord jacket 4 is made, for example, of PVC (polyvinyl chloride). The high strength fibers 5 are made, for example, of Kevler® (aromatic polyamide-based resin).

Referring back to FIG. 1, the optical fiber holder 1 includes a holder main body 6 having a substantially box-like shape. The holder main body 6 includes a fiber receiving groove 7 that has a V-like cross-sectional shape, and receives and positions the coated optical fiber 3 exposed out of the optical fiber cord 2 from which the cord jacket 4 is removed at the tip thereof and a cord receiving groove 8 that has a semicircular cross-sectional shape and receives the cord jacket 4. The fiber receiving groove 7 and the cord receiving groove 8 are formed to be continuous with each other.

A cord introducing groove 9 having a semicircular cross-sectional shape whose radius is greater than that of the cord receiving groove 8 is formed behind the cord receiving groove 8 (on the opposite side of the cord receiving groove 8 to the fiber receiving groove 7) in the holder main body 6. A tapered groove 10 that tapers down from the cord introducing groove 9 to the cord receiving groove 8 is formed between the cord receiving groove 8 and the cord introducing groove 9 in the holder main body 6. The area including the cord receiving groove 8 and the tapered groove 10 in the holder main body 6 forms a cord holding base 11. A cord holding cover 12 and a fiber pressing cover 13, which are made of a metal, are pivotally attached (in an openable and closable manner) to the holder main body 6 via a shaft 14 provided on one side thereof.

A cord receiving groove 15 having a semicircular cross-sectional shape and corresponding to the cord receiving groove 8 of the holder main body 6 and a tapered groove 16 corresponding to the tapered groove 10 of the holder main body 6 are formed on the back side of the cord holding cover 12. The cord receiving groove 15 and the tapered groove 16, when the cord holding cover 12 is closed on the holder main body 6, cooperate with the cord receiving groove 8 and the tapered groove 10 to form an insertion through hole 17 (FIG. 3) that has a circular cross-sectional shape and allows the optical fiber cord 2 to be inserted. The insertion through hole 17 includes an equiradial hole 17a formed by the cord receiving grooves 8 and 15 and a tapered hole 17b formed by the tapered grooves 10 and 16.

The diameter of the equiradial hole 17a is slightly greater than that of the cord jacket 4 of the optical fiber cord 2. Specifically, the equiradial hole 17a has a diameter that allows the high strength fibers 5, which are exposed along with the coated optical fiber 3, to come into contact with the inner wall surfaces of the holder main body 6 (cord holding base 11) and the cord holding cover 12, which form the insertion through hole 17, when the optical fiber cord 2 is inserted into the insertion through hole 17. For example, when the diameter of the cord jacket 4 is 3 mm, the diameter of the equiradial hole 17a is about 3.4 mm.

The fiber pressing cover 13 presses the coated optical fiber 3 received in the fiber receiving groove 7 of the holder main body 6 against the holder main body 6. A groove 18 having a rectangular cross-sectional shape and corresponding to the cord receiving groove 8 of the holder main body 6 is formed on the back side of the fiber pressing cover 13. A rubber 19 that presses the coated optical fiber 3 strongly enough without any damage thereto is further attached to the back side of the fiber pressing cover 13.

A magnet 20 that attracts the cord holding cover 12 and the fiber pressing cover 13, which are made of a metal, is embedded in the holder main body 6 on the other side thereof. The magnet 20 allows, when the cord holding cover 12 and the fiber pressing cover 13 are closed on the holder main body 6, the cord holding cover 12 and the fiber pressing cover 13 to be readily and securely fixed to the holder main body 6.

Figure 3:
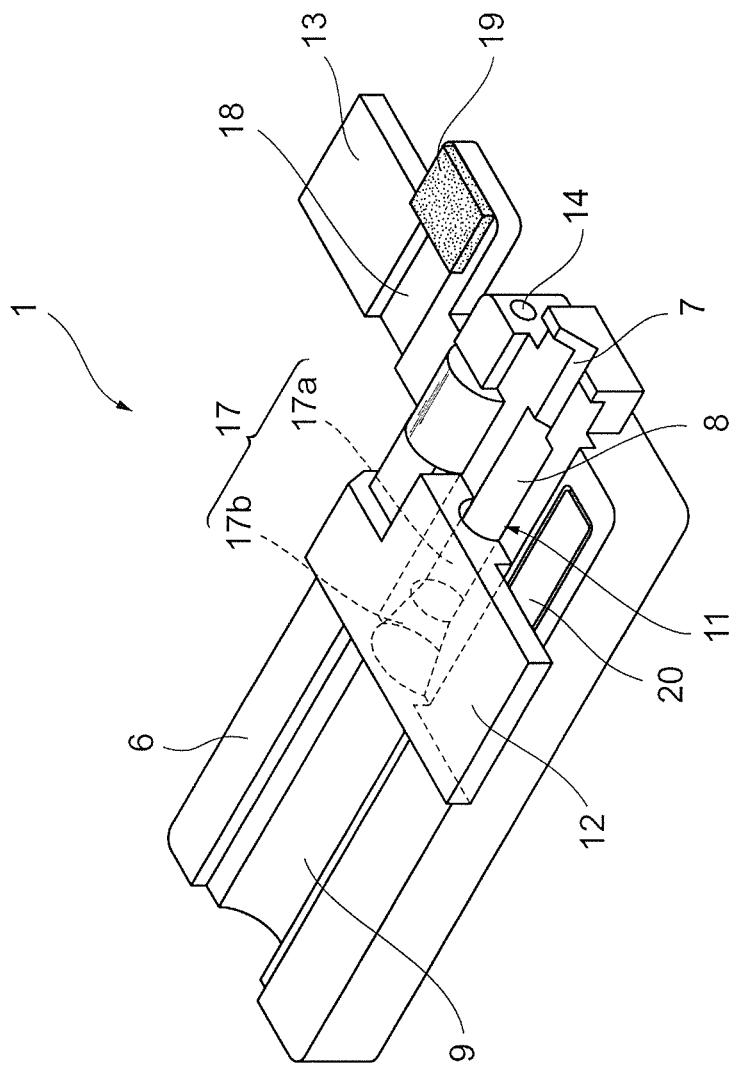
FIG. 3 is a perspective view showing a procedure of holding a coated optical fiber accommodated in an optical fiber cord by using the optical fiber holder according to the first embodiment.
Figure 4:
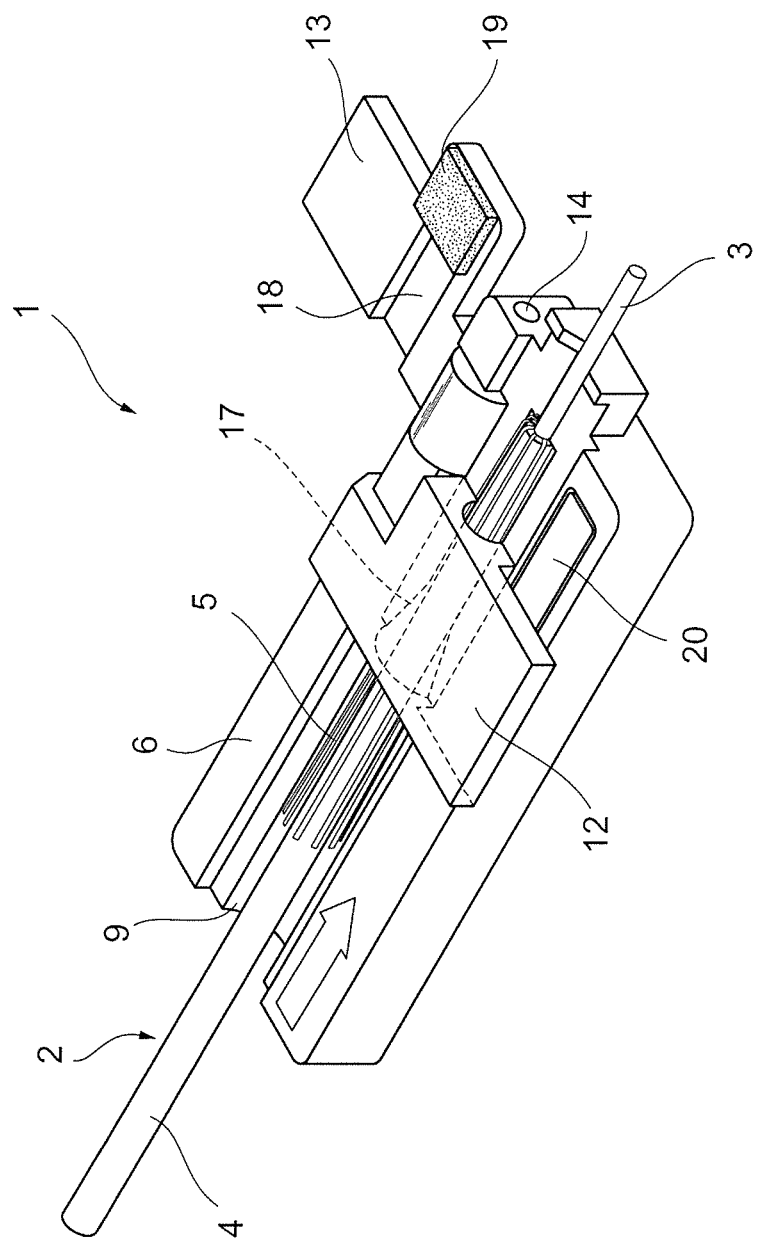
FIG. 4 is a perspective view showing the procedure of holding a coated optical fiber accommodated in an optical fiber cord by using the optical fiber holder according to the first embodiment.
Figure 5:
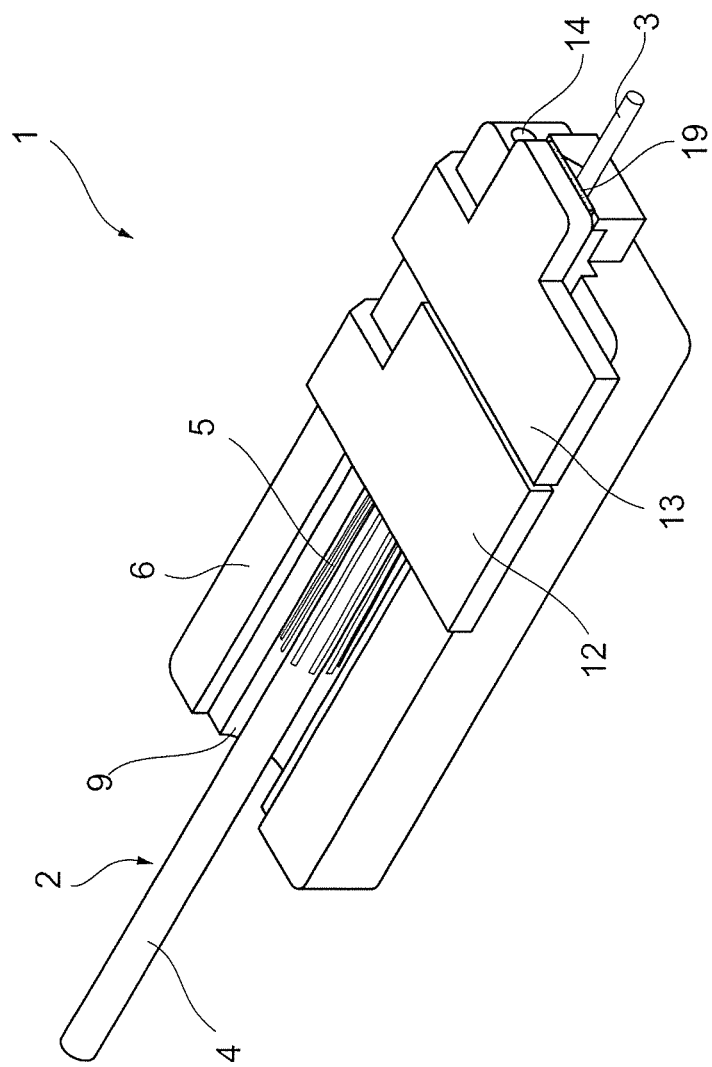
FIG. 5 is a perspective view showing the procedure of holding a coated optical fiber accommodated in an optical fiber cord by using the optical fiber holder according to the first embodiment.

A method for holding the coated optical fiber 3 of the optical fiber cord 2 by using the optical fiber holder 1 when the coated optical fiber 3 is fusion spliced will next be described. FIGS. 3 to 5 are perspective views showing a procedure of holding the coated optical fiber 3 accommodated in the optical fiber cord 2 by using the optical fiber holder 1.

First, the cord jacket 4 at the tip of the optical fiber cord 2 is so removed that the coated optical fiber 3 and the high strength fibers 5 are exposed. At this point, the length of the exposed coated optical fiber 3 and high strength fibers 5 ranges from about 30 to 40 mm. Subsequently, the optical fiber holder 1 with the cord holding cover 12 and the fiber pressing cover 13 open is so operated that the cord holding cover 12 is closed on the holder main body 6 to form the insertion through hole 17 having a circular cross-sectional shape (FIG. 3).

The optical fiber cord 2 is then inserted into the insertion through hole 17 from the side where the cord introducing groove 9 of the holder main body 6 is present (FIG. 4). In this process, since the tapered hole 17b is formed in a rear portion of the insertion through hole 17, the optical fiber cord 2 can be readily inserted into the insertion through hole 17. When the optical fiber cord 2 is inserted into the insertion through hole 17, the exposed high strength fibers 5, which are flexible, are so guided that they come into contact with the inner wall surfaces of the holder main body 6 and the cord holding cover 12, which form the insertion through hole 17, and naturally follow the inner wall surfaces rearward. The exposed high strength fibers 5 are therefore disposed around the cord jacket 4 and will not protrude out of the insertion through hole 17 but only the exposed coated optical fiber 3 will protrude out thereof. In this process, it is desirable that the exposed high strength fibers 5 are routed rearward to some extent in advance relative to the optical fiber cord 2 (on the side where the cord jacket 4 is present) and that the optical fiber cord 2 is then inserted into the insertion through hole 17 with the high strength fibers 5 routed rearward.

The cord jacket 4 of the optical fiber cord 2 is then allowed to protrude out of the insertion through hole 17, and the coated optical fiber 3 is placed on the fiber receiving groove 7 of the holder main body 6. At this point, the tip of the cord jacket 4 is allowed to come into contact with a wall surface that forms the boundary (rear end of fiber receiving groove 7) between the fiber receiving groove 7 and the cord receiving groove 8 of the holder main body 6.

Subsequently, the fiber pressing cover 13 is closed on the holder main body 6 (FIG. 5). The fiber pressing cover 13 thus presses the coated optical fiber 3 against the holder main body 6.

Thereafter, the coating of an end portion (tip) of the coated optical fiber 3 is so removed that the bare fiber 3a is exposed, and the end face of the bare fiber 3a is so cut with a dedicated cutter that the cut face is mirror-finished. Another optical fiber holder 1 in which another coated optical fiber 3 is held is provided. The two sets of optical fiber holders 1 are so placed in a fusion apparatus (not shown) that they face each other, and the bare fibers 3a of the coated optical fibers 3 are fusion spliced to each other. In this process, since the exposed high strength fibers 5 are routed rearward relative to the exposed coated optical fibers 3 and disposed around the cord jackets 4, the high strength fibers 5 will not burn due to high temperature in the fusion discharge process or come into contact with the fusion spliced portion, whereby the quality of the fusion splicing will not be degraded.

Figure 6:
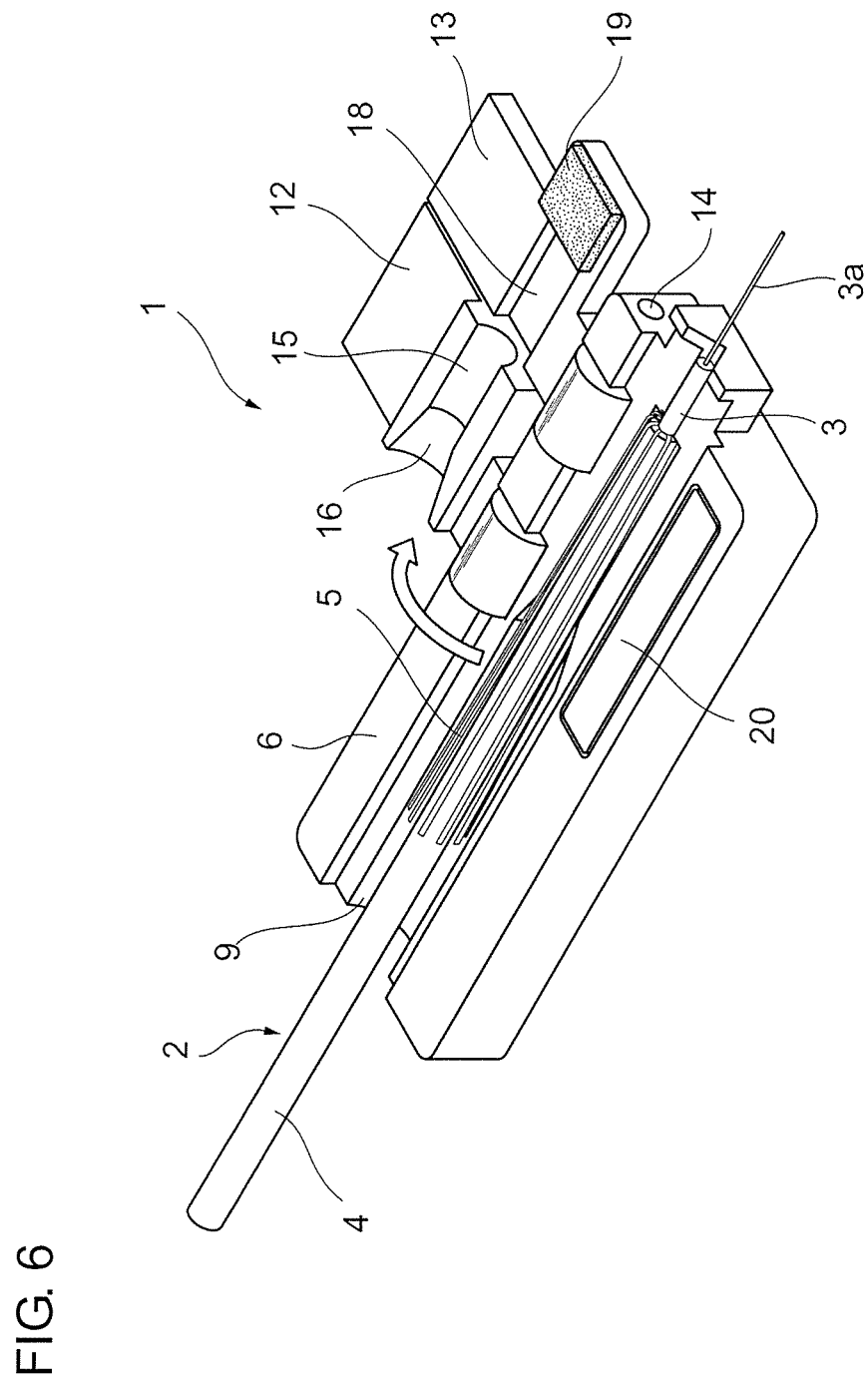
FIG. 6 is a perspective view showing a procedure of removing the optical fiber cord out of the optical fiber holder according to the first embodiment.
Figure 7:
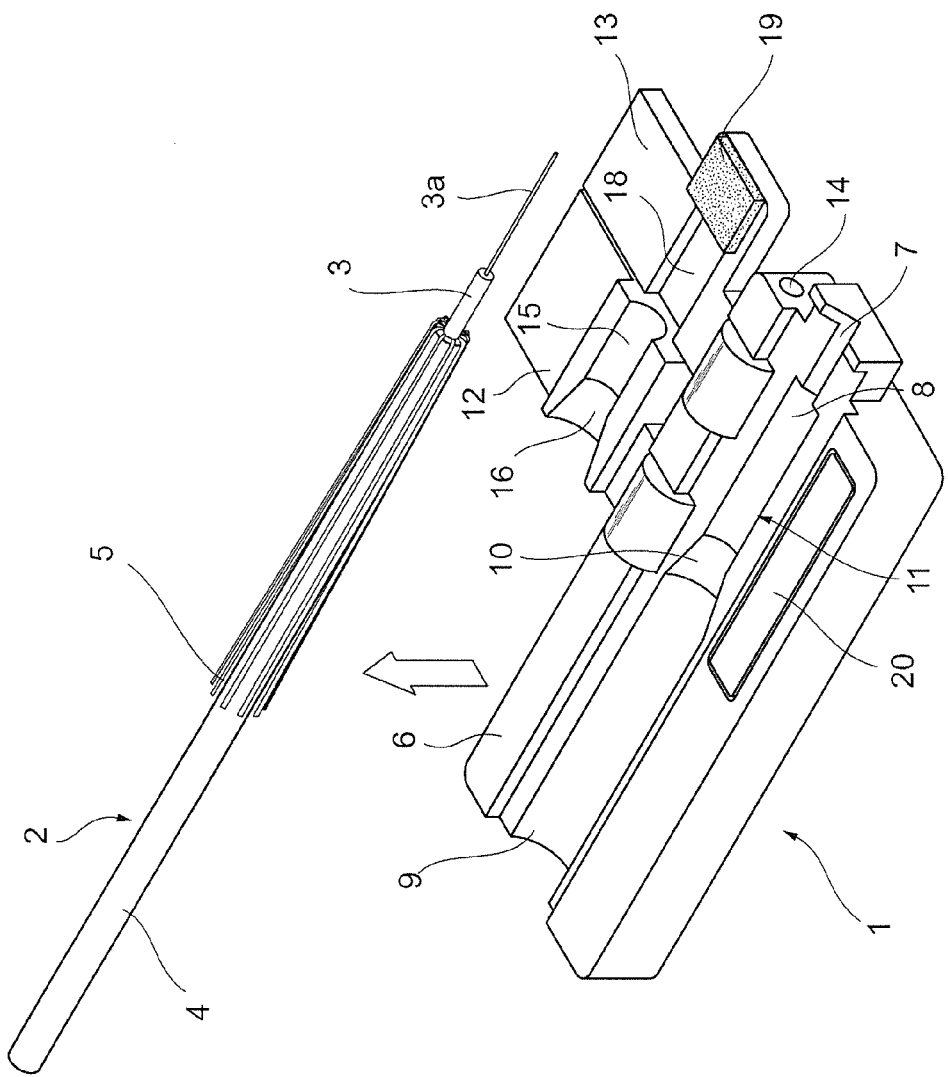
FIG. 7 is a perspective view showing the procedure of removing the optical fiber cord out of the optical fiber holder according to the first embodiment.

FIGS. 6 and 7 are perspective views showing a procedure of removing the optical fiber cord 2 out of the optical fiber holder 1. After the fusion splicing is completed, the cord holding cover 12 and the fiber pressing cover 13 are opened (FIG. 6). The optical fiber cord 2 having been fusion spliced to the other optical fiber cord (not shown) is then removed out of the holder main body 6 (FIG. 7).

In the first embodiment described above, in the process of placing the optical fiber cord 2 in the optical fiber holder 1, the optical fiber cord 2 is inserted into the insertion through hole 17 with the cord holding cover 12 closed on the holder main body 6, and the exposed high strength fibers 5 come into contact with the inner wall surfaces of the holder main body 6 and the cord holding cover 12, which form the insertion through hole 17, naturally follow the inner wall surfaces rearward, and are disposed around the cord jacket 4. The high strength fibers 5 can thus be handled readily with no loss of splicing quality when the optical fiber cord 2 undergoes fusion splicing. As a result, the operation time can be shortened and the operation efficiency can be improved.

Further, since no special skill or experience is required to handle the high strength fibers 5, skill and other personal differences of operators will not affect the handling of the high strength fibers 5. The fusion splicing of the optical fiber cord 2 can therefore be stably performed with high quality. In addition, since the cord holding base 11 is integrated with the holder main body 6, the number of parts of the optical fiber holder 1 is reduced and the structure thereof is simplified.

Figure 8:
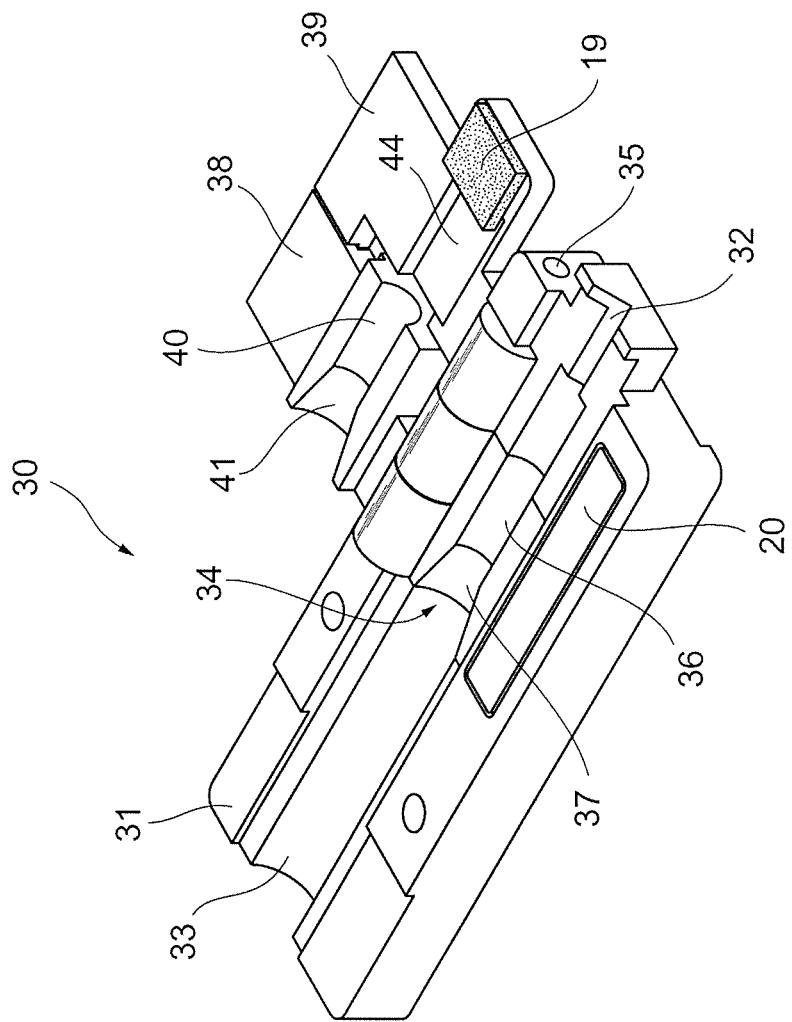
FIG. 8 is a perspective view showing a second embodiment of the optical fiber holder according to the invention.
Figure 9:
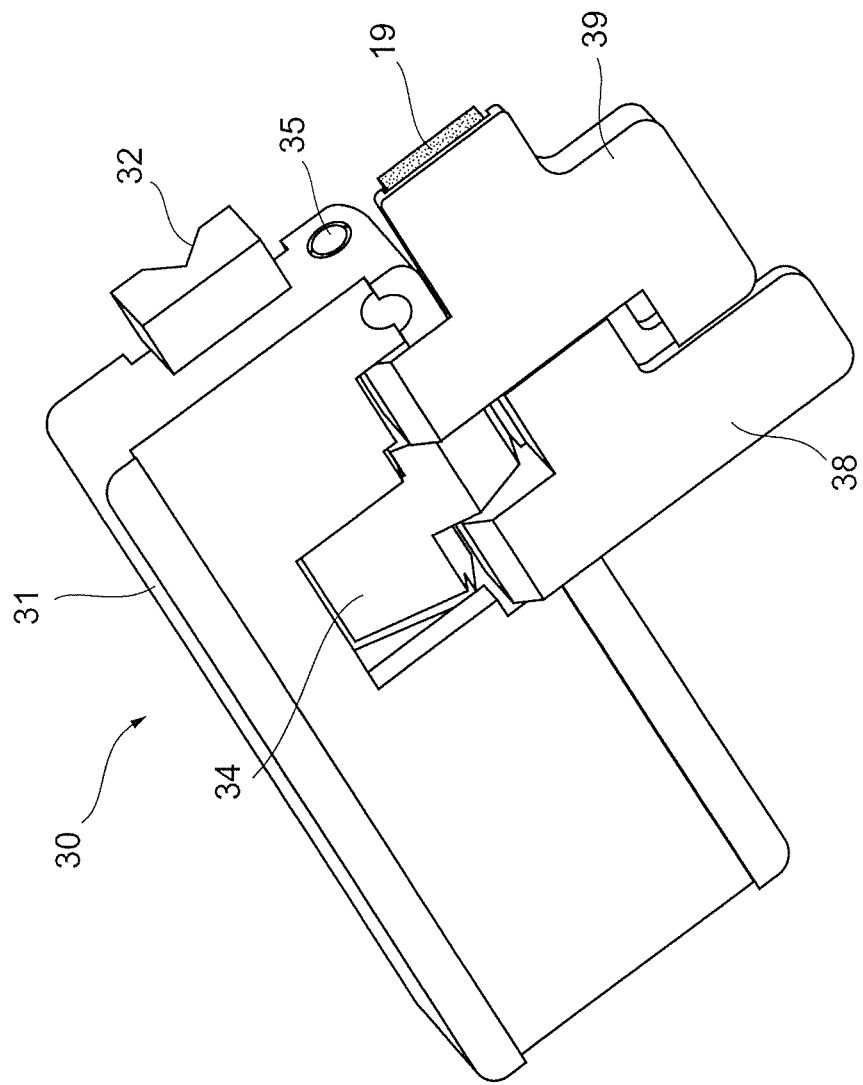
FIG. 9 is a perspective view of the optical fiber holder according to the second embodiment viewed from below.

FIG. 8 is a perspective view showing an optical fiber holder 30 according to a second embodiment of the invention. FIG. 9 is a perspective view of the optical fiber holder 30 viewed from below. The optical fiber holder 30 includes a holder main body 31 having a substantially box-like shape. A fiber receiving groove 32 that has a V-like cross-sectional shape and receives and positions the coated optical fiber 3 exposed out of the optical fiber cord 2 (FIG. 2) is formed in an end portion of the holder main body 31 on one side, and a cord introducing groove 33 having a semicircular cross-sectional shape is formed in an end portion of the holder main body 31 on the other side.

A cord holding base 34 is pivotally attached (in an openable and closable manner) to the holder main body 31 via a shaft 35 provided on one side thereof. The cord holding base 34 is so configured that stopper means (not shown) limits the pivotal motion of the cord holding base 34 relative to the holder main body 31 to a predetermined angle (30 degrees, for example).

The cord holding base 34, when closed on the holder main body 31, is located between the fiber receiving groove 32 and the cord introducing groove 33. The cord holding base 34 has a cord receiving groove 36 that is positioned on the side where the fiber receiving groove 32 is present, has a semicircular cross-sectional shape, and receives the cord jacket 4 of the optical fiber cord 2, and a tapered groove 37 that is positioned on the side where the cord introducing groove 33 is present and tapers down from the cord introducing groove 33 to the cord receiving groove 36. A cord holding cover 38 and a fiber pressing cover 39, which are made of a metal, are pivotally attached (in an openable and closable manner) to the holder main body 31 via the shaft 35.

A cord receiving groove 40 having a semicircular cross-sectional shape and corresponding to the cord receiving groove 36 of the holder main body 31 and a tapered groove 41 corresponding to the tapered groove 37 of the holder main body 31 are formed on the back side of the cord holding cover 38. The cord receiving groove 40 and the tapered groove 41 cooperate with the cord receiving groove 36 and the tapered groove 37 to form an insertion through hole 42 (FIG. 10) that has a circular cross-sectional shape and allows the optical fiber cord 2 to be inserted. The diameter of the insertion through hole 42 is equal to that of the insertion through hole 17 in the first embodiment. A stepped portion 43 is provided on the front side of the cord holding cover 38 on the side adjacent to the fiber pressing cover 39.

The fiber pressing cover 39 presses the coated optical fiber 3 received in the fiber receiving groove 32 of the holder main body 31 against the holder main body 31. A groove 44 having a cross-sectional being rectangular is formed on the back side of the fiber pressing cover 39. The rubber 19 is further attached to the back side of the fiber pressing cover 39. A stepped portion 45 that engages with the stepped portion 43 of the cord holding cover 38 is provided on the back side of the fiber pressing cover 39 adjacent to the cord holding cover 38. The magnet 20, which attracts the cord holding cover 38 and the fiber pressing cover 39, which are made of a metal, is embedded in the holder main body 31 on the other side thereof.

A method for holding the coated optical fiber 3 of the optical fiber cord 2 by using the optical fiber holder 30 when the coated optical fiber 3 is fusion spliced will next be described. FIGS. 10 to 15 are perspective views showing a procedure of holding the coated optical fiber 3 accommodated in the optical fiber cord 2 by using the optical fiber holder 30.

First, the cord jacket 4 at the tip of the optical fiber cord 2 is so removed that the coated optical fiber 3 and the high strength fibers 5 are exposed. Thereafter, the coating of an end portion of the coated optical fiber 3 is so removed that the bare fiber 3a is exposed, and the end face of the bare fiber 3a is so cut that the cut face is mirror-finished. At this point, the length of the exposed coated optical fiber 3 is, for example, about 15 mm, for example, about 10 mm of which is the length of the exposed bare fiber 3a. The length of the exposed high strength fibers 5 ranges, for example, from about 30 to 40 mm.

Figure 10:
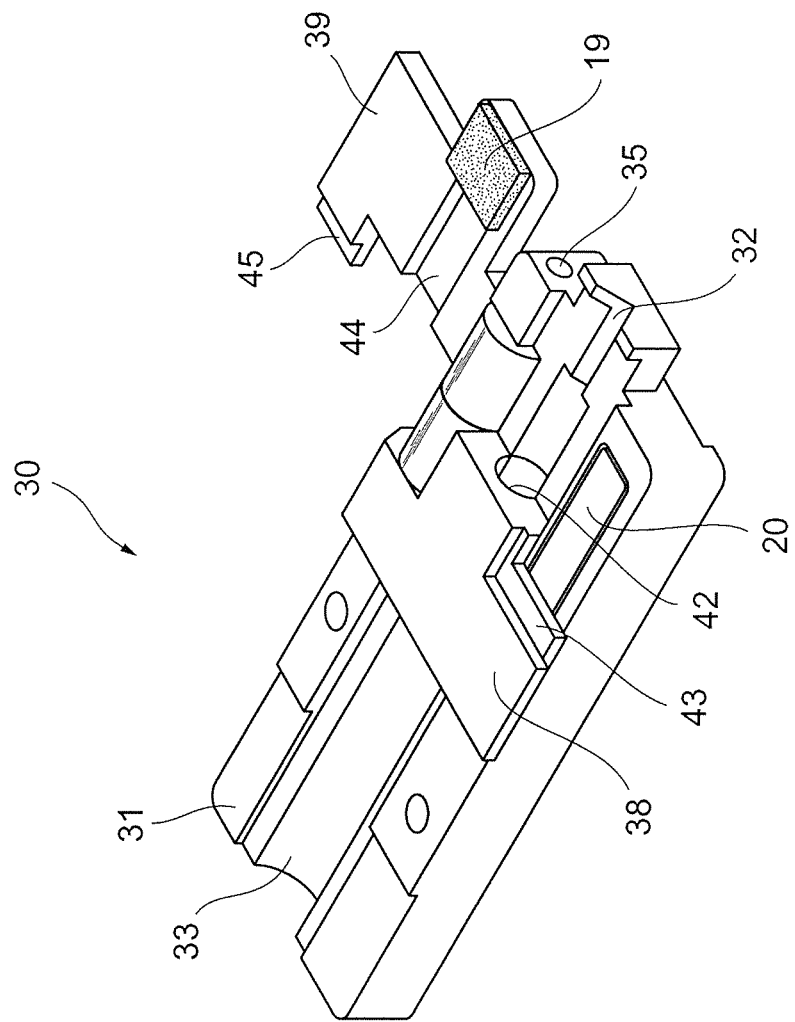
FIG. 10 is a perspective view showing a procedure of holding a coated optical fiber accommodated in an optical fiber cord by using the optical fiber holder according to the second embodiment.
Figure 11:
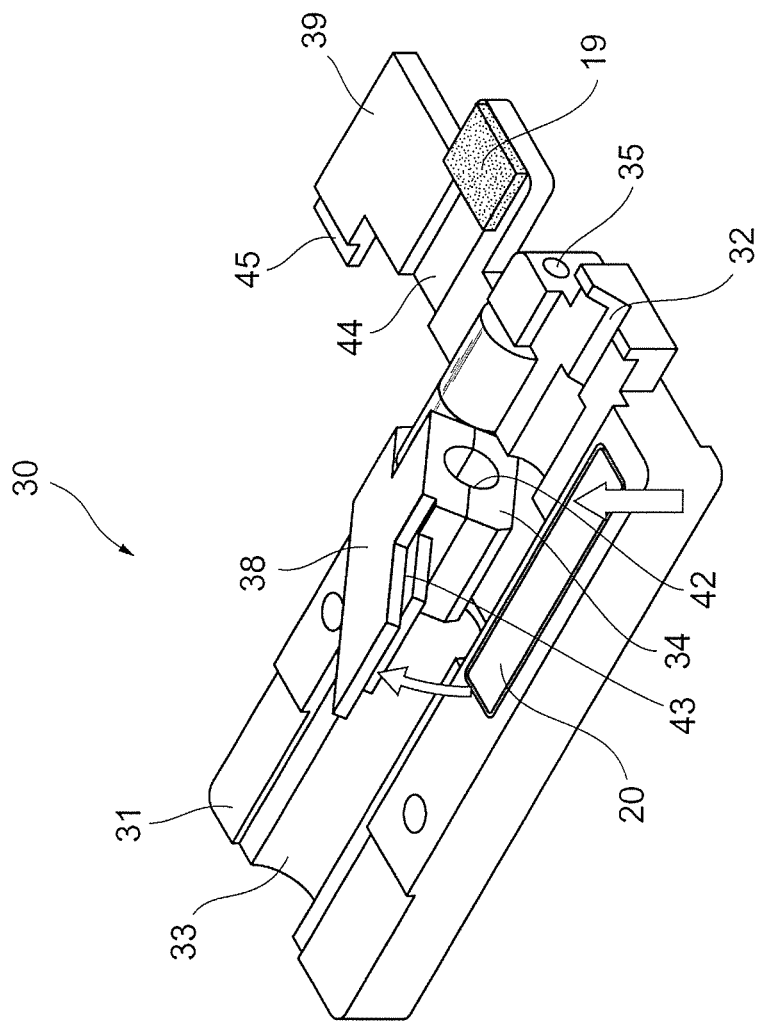
FIG. 11 is a perspective view showing the procedure of holding a coated optical fiber accommodated in an optical fiber cord by using the optical fiber holder according to the second embodiment.

Subsequently, the optical fiber holder 30 with the cord holding base 34 closed and the cord holding cover 38 and the fiber pressing cover 39 open is so operated that the cord holding cover 38 is closed on the holder main body 31 to form the insertion through hole 42 having a cross-section being circular (FIG. 10). The cord holding base 34 is then manually pressed from the bottom side of the holder main body 31, so that the cord holding base 34 along with the cord holding cover 38 is lifted relative to the holder main body 31 (FIG. 11). In this process, the cord holding base 34 and the cord holding cover 38 are lifted to a point where the stopper means (not shown) limits the pivotal motion thereof.

Figure 12:
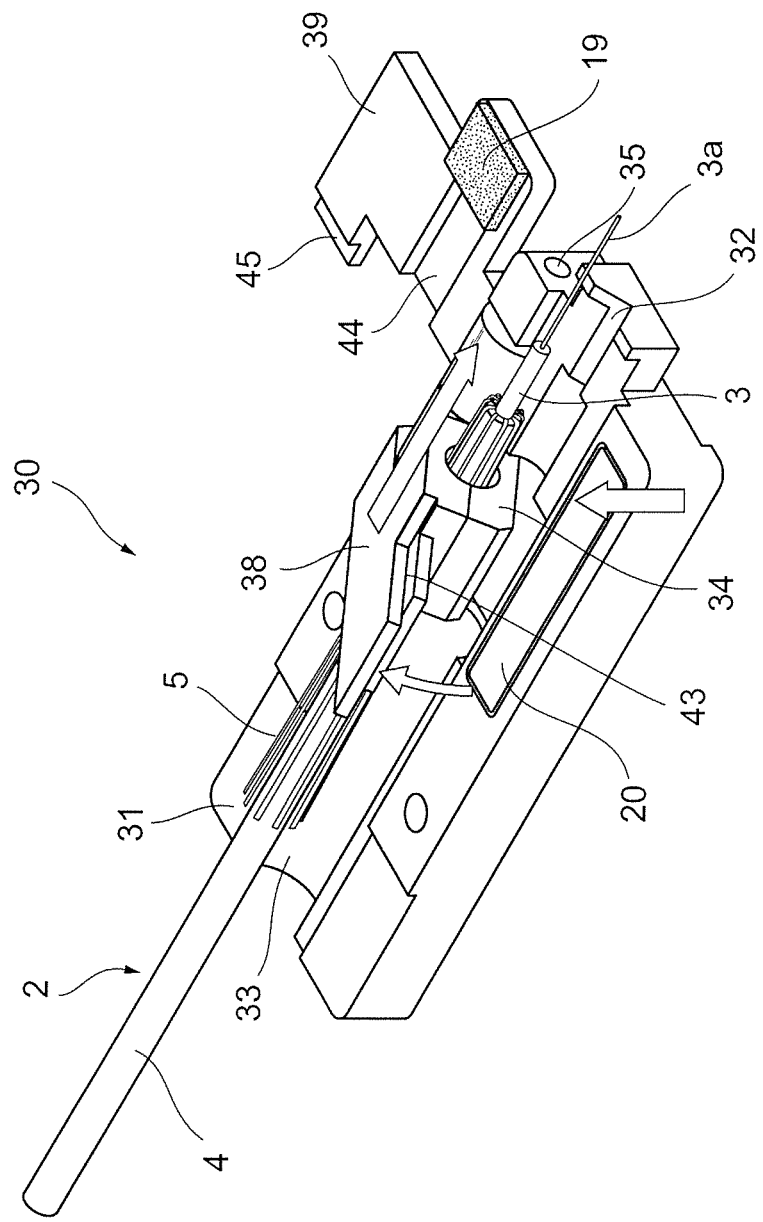
FIG. 12 is a perspective view showing the procedure of holding a coated optical fiber accommodated in an optical fiber cord by using the optical fiber holder according to the second embodiment.

Subsequently, for example, with one hand pressing the cord holding base 34 from the bottom side of the holder main body 31, the optical fiber cord 2 is inserted into the insertion through hole 42 with the other hand from the side where the cord introducing groove 33 is present (FIG. 12). In this process, since the exposed high strength fibers 5 are so guided that they come into contact with the inner wall surfaces of the cord holding base 34 and the cord holding cover 38, which form the insertion through hole 42, and naturally follow the inner wall surfaces rearward, the high strength fibers 5 are disposed around the cord jacket 4.

Figure 13:
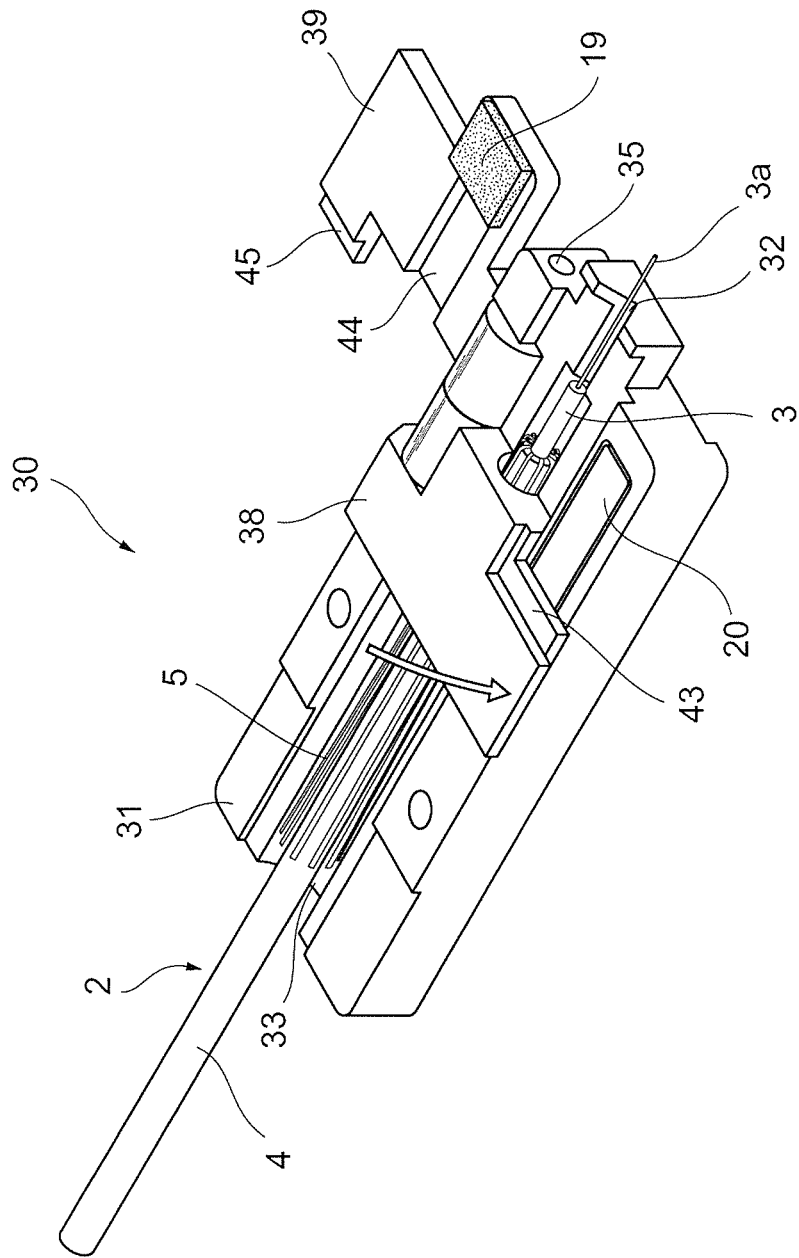
FIG. 13 is a perspective view showing the procedure of holding a coated optical fiber accommodated in an optical fiber cord by using the optical fiber holder according to the second embodiment.
Figure 14:
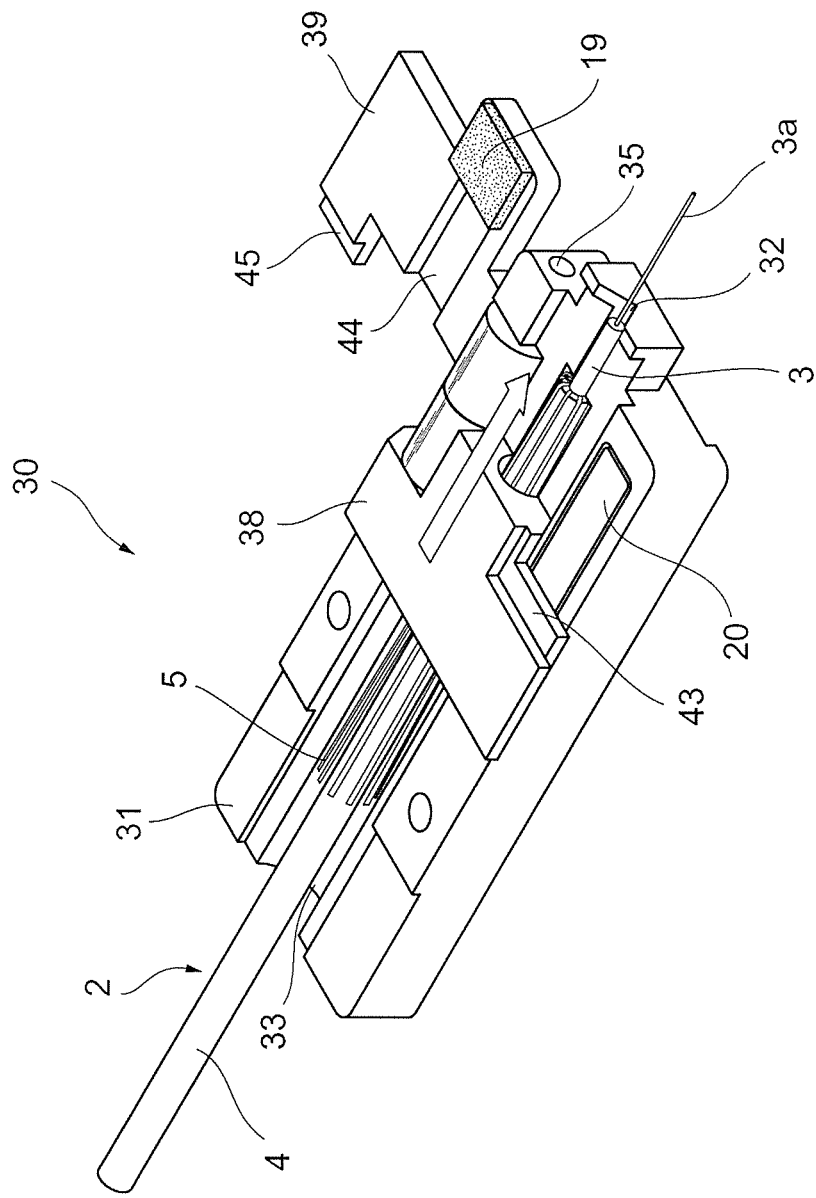
FIG. 14 is a perspective view showing the procedure of holding a coated optical fiber accommodated in an optical fiber cord by using the optical fiber holder according to the second embodiment.

After the cord jacket 4 of the optical fiber cord 2 protrudes out of the insertion through hole 42, the one hand releases the cord holding base 34 to close the cord holding base 34 and the cord holding cover 38 on the holder main body 31 (FIG. 13). At this point, the coated optical fiber 3 is placed on the fiber receiving groove 32 of the holder main body 31. Subsequently, the tip of the cord jacket 4 is allowed to come into contact with the wall surface that forms the rear end of the fiber receiving groove 32 of the holder main body 31.

Figure 15:
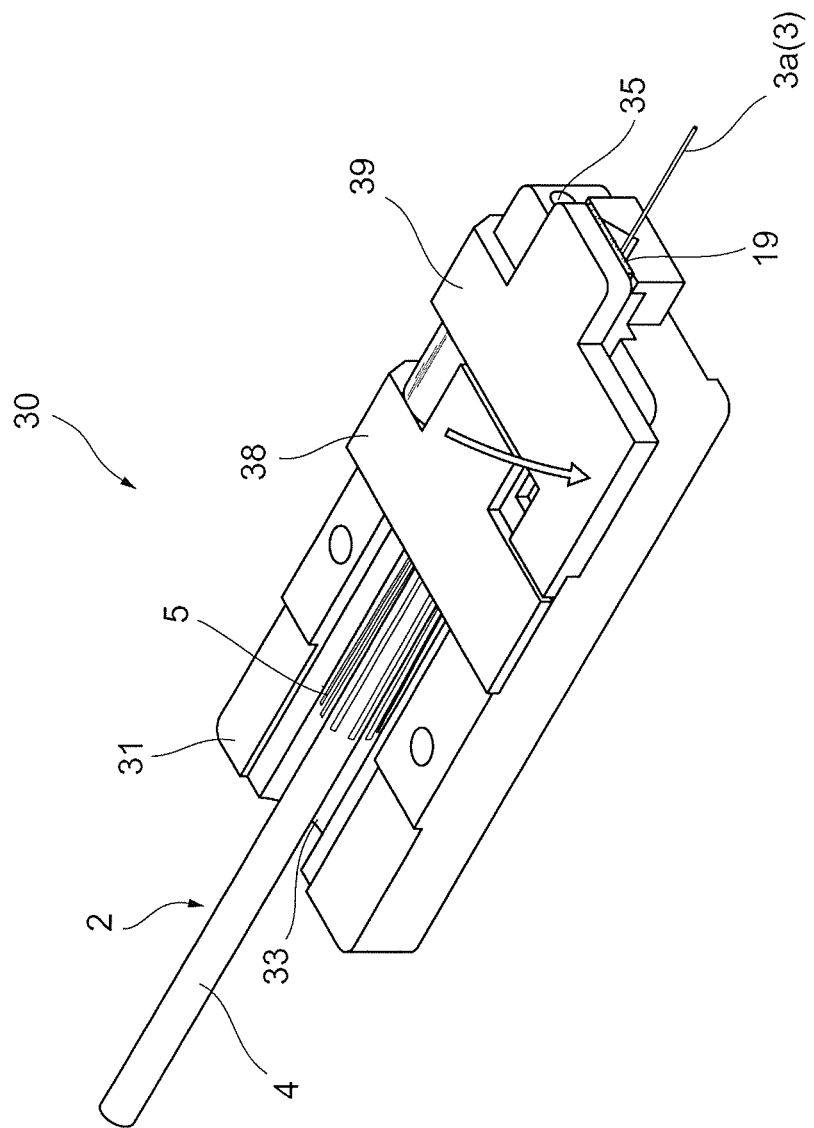
FIG. 15 is a perspective view showing the procedure of holding a coated optical fiber accommodated in an optical fiber cord by using the optical fiber holder according to the second embodiment.

The fiber pressing cover 39 is then closed on the holder main body 31, so that the fiber pressing cover 39 presses the coated optical fiber 3 against the holder main body 31 (FIG. 15). At this point, the stepped portion 45 of the fiber pressing cover 39 is placed on the stepped portion 43 of the cord holding cover 38. Thereafter, another optical fiber holder 30 in which another coated optical fiber 3 is held is provided. The two sets of optical fiber holders 30 are so placed in a fusion apparatus (not shown) that they face each other, and the bare fibers 3a of the coated optical fibers 3 are fusion spliced to each other.

Figure 16:
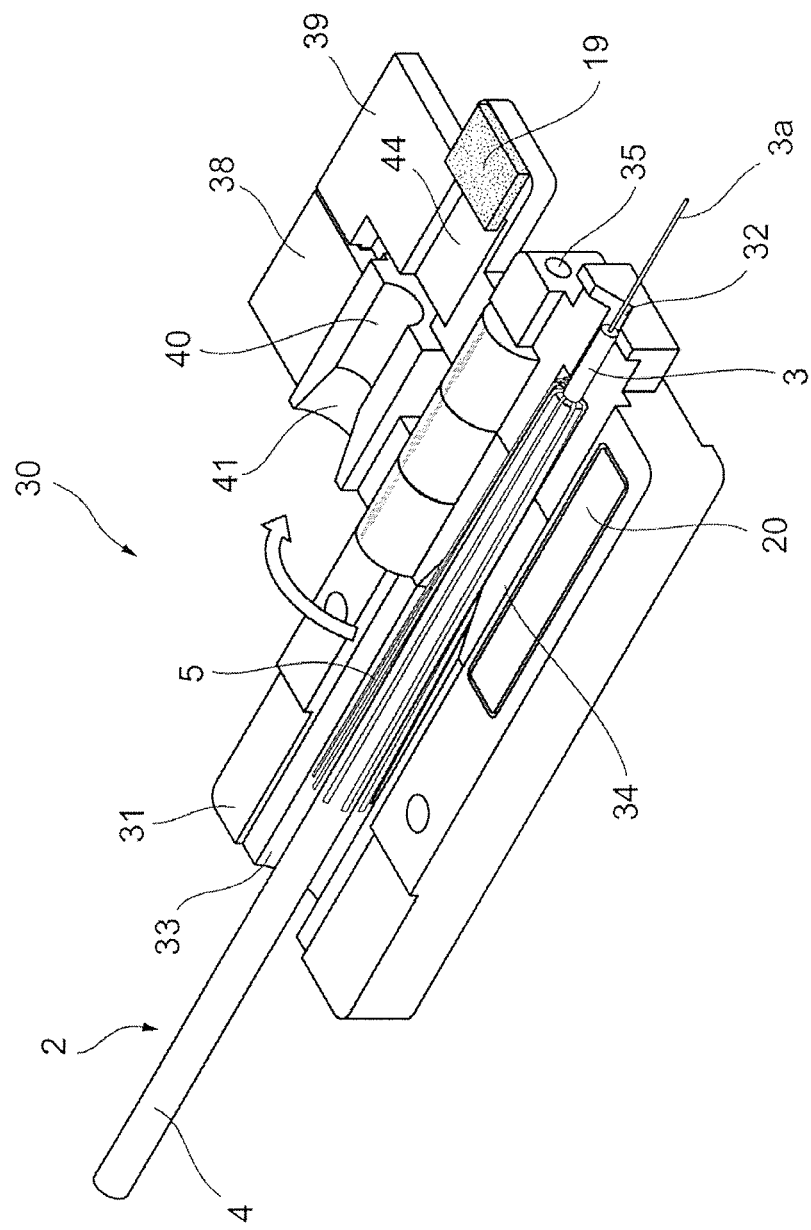
FIG. 16 is a perspective view showing a procedure of removing the optical fiber cord out of the optical fiber holder according to the second embodiment.
Figure 17:
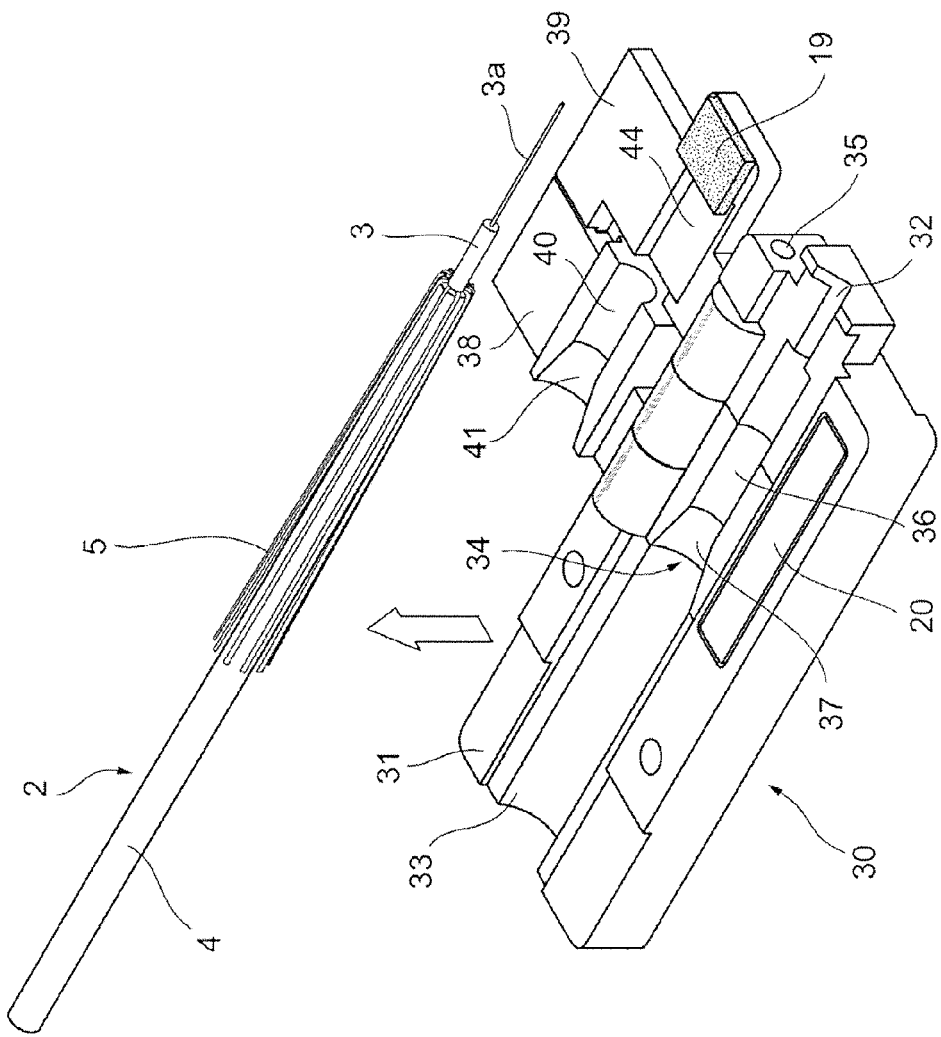
FIG. 17 is a perspective view showing the procedure of removing the optical fiber cord out of the optical fiber holder according to the second embodiment.

FIGS. 16 and 17 are perspective views showing a procedure of removing the optical fiber cord 2 out of the optical fiber holder 30. After the fusion splicing is completed, the cord holding cover 38 and the fiber pressing cover 39 are opened (FIG. 16). In this process, since the stepped portion 45 of the fiber pressing cover 39 has been placed on the stepped portion 43 of the cord holding cover 38, opening the cord holding cover 38 allows the cord holding cover 38 to press and open the fiber pressing cover 39. It is, of course, noted that the fiber pressing cover 39 can first be opened and the cord holding cover 38 can then be opened. The optical fiber cord 2 having been fusion spliced to the other optical fiber cord (not shown) is then removed out of the holder main body 31 (FIG. 17).

In the second embodiment described above, in the process of placing the optical fiber cord 2 in the optical fiber holder 1, the cord holding base 34 and the cord holding cover 38 are lifted relative to the holder main body 31 with the insertion through hole 42 formed by the cord holding base 34 and the cord holding cover 38, whereby the insertion through hole 42 is positioned apart from the holder main body 31. As a result, when the optical fiber cord 2 is inserted into the insertion through hole 42, the bare fiber 3a exposed at the tip of the optical fiber cord 2 will not come into contact with the holder main body 31. High-quality fusion splicing can thus be stably performed even when the coated optical fiber 3 has undergone end treatment in advance.

The invention is not limited to the embodiments described above. For example, in the embodiments described above, each of the cord receiving grooves 8, 15 and the cord receiving grooves 36, 40 has a cross-section being semicircular, but the shape of each of the cord receiving grooves is not limited to a semicircular cross-sectional shape and can be any cross-sectional shape that cooperates with the cross-sectional shape of the opposing cord receiving groove to form a cross-section being circular of the insertion through hole. Further, the insertion through hole does not necessarily have a cross-section being circular.

INDUSTRIAL APPLICABILITY

The invention is applicable to a process of holding a coated optical fiber of an optical fiber cord when the coated optical fiber is fusion spliced to a coated optical fiber of another optical fiber cord.

The invention claimed is:

1. An optical fiber holder for holding a coated optical fiber of an optical fiber cord, the optical fiber cord also including high strength fibers and a cord jacket that surrounds the coated optical fiber and the high strength fibers, the optical fiber holder comprising:

a holder main body including a fiber receiving groove configured to receive an exposed section of the coated optical fiber extending out of the optical fiber cord, with a section of the cord jacket of the optical fiber cord removed from a tip of the optical fiber cord;

a cord holding base including a first cord receiving groove configured to receive the cord jacket of the optical fiber cord;

a cord holding cover attached to the holder main body to move between an open position and a closed position, the cord holding cover including a second receiving groove that cooperates with the first cord receiving groove to define an insertion through hole into which the optical fiber cord is inserted with the cord holding cover in the closed position; and a fiber pressing cover attached to the holder main body to move between an open position and a closed position, such that the fiber pressing cover presses the coated optical fiber against the fiber receiving groove of the holder main body with the fiber pressing cover in the closed position and the coated optical fiber is located in the fiber receiving groove, wherein the insertion through hole is shaped and dimensioned such that exposed sections of the high strength fibers are bent back to extend along an outer surface of the optical fiber cord as the optical fiber cord and the exposed section of the coated optical fiber are inserted into the insertion through hole, with the exposed sections of the high strength fibers further coming into contact with the first cord receiving groove of the holder main body and the second receiving groove of the cord holding cover with the cord holding cover in the closed position.

2. The optical fiber holder according to claim 1, wherein the cord holding base is integrated with the holder main body and the holding main body further includes a cord introducing groove and a first tapered groove that are both aligned with the first cord receiving groove.

3. The optical fiber holder according to claim 2, wherein the cord introducing groove has a diameter that is larger than the diameter of the first cord receiving groove and the tapered groove defines a semi-conical shape between the cord introducing groove and the first cord receiving groove.

4. The optical fiber holder according to claim 2, wherein the cord holding cover includes a second tapered groove adjacent to and aligned with the second receiving groove, the first and second tapered grooves defining a funnel shaped end of the insertion through hole with the cord holding cover in the closed position.

5. The optical fiber holder according to claim 1, wherein the cord holding base is attached to the holder main body for movement between the open position and the closed position independent of movement of the cord holding cover.

6. The optical fiber holder according to claim 5, wherein the cord holding base and the cord holding cover are attached to the holder main body for movement about a pivot shaft.

7. A method for holding a coated optical fiber of an optical fiber cord, the optical fiber cord also including high strength fibers and a cord jacket that surrounds the coated optical fiber and the high strength fibers, the method comprising:
providing the optical fiber holder according to claim 1;
exposing the coated optical fiber and the high strength fibers by removing a section of the cord jacket at a tip of the optical fiber cord;
inserting the optical fiber cord into the insertion through hole formed by the cord holding base and the cord holding cover so that the coated optical fiber is received by the fiber receiving groove; and
pressing the coated optical fiber with the fiber pressing cover against the holder main body.

8. The optical fiber holder according to claim 1, wherein the cord holding base and the cord holding cover are attached to the holder main body for movement about a pivot shaft.

* * * * *